US012670819B2

(12) United States Patent
Gros España et al.

(10) Patent No.: US 12,670,819 B2
(45) Date of Patent: Jun. 30, 2026

(54) DEVICE FOR DISPLAYING IMAGES FOR STANDS OR STAIRWAYS

(71) Applicant: STAIRMEDIA BCN, S.L., Barcelona (ES)

(72) Inventors: Sergio Gros España, Vilassar de Dalt (ES); Javier Palmerola Fernandez, Barcelona (ES); David Boris Boja Pastor, Barcelona (ES); Jesus Prio Batalla, Barcelona (ES); Rafael Coto Barrios, Barcelona (ES)

(73) Assignee: STAIRMEDIA BCN, S.L., Madrid (ES)

( * ) Notice: Subject to any disclaimer, the term of this patent is extended or adjusted under 35 U.S.C. 154(b) by 108 days.

(21) Appl. No.: 17/252,158

(22) PCT Filed: Jun. 25, 2019

(86) PCT No.: PCT/ES2019/070443

§ 371 (c)(1),
(2) Date: Dec. 14, 2020

(87) PCT Pub. No.: WO2020/002735

PCT Pub. Date: Jan. 2, 2020

(65) Prior Publication Data

US 2021/0255818 A1      Aug. 19, 2021

(30) Foreign Application Priority Data

| Jun. 26, 2018 | (EP) | ..................................... | 18382473 |
| Oct. 3, 2018 | (EP) | ..................................... | 18382701 |
| Jun. 21, 2019 | (ES) | ................................... | 201931056 |

(51) Int. Cl.
| *G09F 23/00* | (2006.01) |
| *E04H 3/12* | (2006.01) |
(Continued)

(52) U.S. Cl.
CPC ............... *G09F 23/00* (2013.01); *E04H 3/12* (2013.01); *G06F 3/1431* (2013.01);
(Continued)

(58) Field of Classification Search
CPC ........ G06F 3/147; G06F 3/1446; G06F 21/84; G06F 3/1431; G09G 2380/02;
(Continued)

(56) References Cited

U.S. PATENT DOCUMENTS

| 4,394,714 A | * | 7/1983 | Rote | ..................... | F21V 33/006 |
| | | | | | 362/576 |
| 5,775,016 A | * | 7/1998 | Chien | ..................... | G09F 19/22 |
| | | | | | 362/570 |
(Continued)

FOREIGN PATENT DOCUMENTS

| CN | 201282510 Y | 7/2009 |
| CN | 101591958 | 12/2009 |
(Continued)

OTHER PUBLICATIONS

International Search Report and Written Opinion for PCT/ES2019/070443, mailed Oct. 1, 2019.
(Continued)

*Primary Examiner* — William Boddie
*Assistant Examiner* — Alecia D English
(74) *Attorney, Agent, or Firm* — Merchant & Gould P.C.

(57) ABSTRACT

A device for displaying images for stands or stairways in a public venue includes a controller and a set of electronic screens connected to one another. Mounting devices secure the electronic screens to the risers of an existing stairway or stand. The controller controls displaying an advertising motif distributed between all the electronic screens.

5 Claims, 9 Drawing Sheets

(51) Int. Cl.

| | |
|---|---|
| *G06F 3/14* | (2006.01) |
| *G06Q 30/0241* | (2023.01) |
| *G06Q 90/00* | (2006.01) |
| *G09F 9/302* | (2006.01) |
| *G09F 9/33* | (2006.01) |

(52) U.S. Cl.
CPC ....... *G06F 3/1446* (2013.01); *G06Q 30/0241* (2013.01); *G06Q 90/205* (2013.01); *G09F 9/3026* (2013.01); *G09F 9/33* (2013.01)

(58) Field of Classification Search
CPC .............. E04F 11/00; E04F 2011/1046; E04F 2011/1048; E04H 3/12; G06Q 30/0241; G06Q 90/205; G09F 19/22; G09F 23/00; G09F 9/3026; G09F 9/33
See application file for complete search history.

(56) References Cited

U.S. PATENT DOCUMENTS

| | | | | |
|---|---|---|---|---|
| 6,041,533 | A * | 3/2000 | Lemmond, Jr. | G09F 19/22 |
| | | | | 40/594 |
| 6,593,902 | B1 | 7/2003 | Ogino | |
| 7,954,973 | B1 * | 6/2011 | Holland | F21S 2/00 |
| | | | | 362/20 |
| 8,534,009 | B2 * | 9/2013 | Kay | E04F 11/166 |
| | | | | 52/28 |
| 8,928,554 | B2 * | 1/2015 | Hine | G09F 19/22 |
| | | | | 345/1.3 |
| 2004/0075618 | A1 * | 4/2004 | Kohan | G09F 19/22 |
| | | | | 345/1.1 |
| 2006/0288139 | A1 * | 12/2006 | Lee | G06F 1/16 |
| | | | | 710/62 |
| 2009/0119962 | A1 * | 5/2009 | De La Cruz | G09F 15/0043 |
| | | | | 40/616 |
| 2012/0293393 | A1 * | 11/2012 | Hine | B65G 15/00 |
| | | | | 345/1.3 |
| 2012/0301635 | A1 * | 11/2012 | Hasegawa | C08J 7/042 |
| | | | | 428/354 |
| 2013/0054656 | A1 * | 2/2013 | Conroy | G06F 1/1656 |
| | | | | 707/821 |
| 2014/0101560 | A1 | 4/2014 | Kwak et al. | |
| 2014/0192456 | A1 * | 7/2014 | Mills | H02B 3/00 |
| | | | | 361/622 |
| 2014/0376219 | A1 | 12/2014 | Ono et al. | |
| 2015/0344270 | A1 * | 12/2015 | Goldstein | B66B 25/003 |
| | | | | 700/230 |
| 2020/0110311 | A1 * | 4/2020 | Gordon | G02F 1/133603 |
| 2020/0186709 | A1 * | 6/2020 | Siu | H04N 23/698 |
| 2020/0226959 | A1 * | 7/2020 | Miyajima | G09F 27/005 |
| 2021/0091282 | A1 * | 3/2021 | Li | H01L 33/62 |

FOREIGN PATENT DOCUMENTS

| | | | | | |
|---|---|---|---|---|---|
| CN | 101591958 | A | 12/2009 | | |
| CN | 201622793 | U | 11/2010 | | |
| CN | 202120529 | | 1/2012 | | |
| CN | 202120529 | U | 1/2012 | | |
| CN | 102419701 | A | 4/2012 | | |
| CN | 202352300 | | 7/2012 | | |
| CN | 202534317 | U | 11/2012 | | |
| CN | 103077577 | A | 5/2013 | | |
| CN | 103263733 | A | 8/2013 | | |
| CN | 203644370 | U | 6/2014 | | |
| CN | 203689842 | | 7/2014 | | |
| CN | 104167178 | | 11/2014 | | |
| CN | 104318687 | A | 1/2015 | | |
| CN | 106548714 | A | 3/2017 | | |
| CN | 107533357 | A | 1/2018 | | |
| EP | 2534823 | A1 | 12/2012 | | |
| IN | 107867611 | A | 4/2018 | | |
| JP | 2003213868 | A | 7/2003 | | |
| JP | 2003216087 | A | * | 7/2003 | |
| JP | 2007171629 | | 7/2007 | | |
| JP | 2010039445 | | 2/2010 | | |
| JP | 5981681 | | 8/2016 | | |
| KR | 101253565 | B1 | 4/2013 | | |
| KR | 200482397 | | 1/2017 | | |
| KR | 200482397 | Y1 | 1/2017 | | |
| RU | 2143995 | C1 | 1/2000 | | |
| RU | 34271 | U1 | 11/2003 | | |
| RU | 45044 | U1 | 4/2005 | | |
| RU | 101566 | U1 | 1/2011 | | |
| WO | 2009063266 | | 5/2009 | | |
| WO | WO-2009063266 | A1 | * | 5/2009 | ............. G09F 19/22 |
| WO | 2011/100580 | A1 | 8/2011 | | |
| WO | 2017047938 | A1 | 3/2017 | | |

OTHER PUBLICATIONS

Office Action for Corresponding KR Application No. 10-2020-7035297 mailed Jul. 1, 2022. (14 pages, with English X Translation).

Office Action for Corresponding CN Application No. 201980038958.0 mailed Jun. 15, 2022. (23 pages, with English Translation) .

Office Action for RU Application No. 2020134023 (Sep. 22, 2021).

Search Report for SG Application No. 11202010373X (Apr. 7, 2022).

Examination Search Report from corresponding application in Canada 3,096,784, dated Sep. 11, 2022.

Patent Examination Report 2 from corresponding application in New Zealand 768730, dated Aug. 31, 2022.

Patent Examination Report No. 3 received in corresponding application in Australia 2019293808, dated Dec. 13, 2022.

Decision of Dismissal of Amendment, Office Action received in corresponding application in Japan, Dec. 6, 2022, four pages.

Rejection Decision, Office Action received in corresponding application in China, Feb. 10, 2023, nine pages.

Preliminary Conclusion of the Qualification Examination, Office Action received in corresponding application in Ukraine dated Mar. 16, 2023, five pages.

Australian Examination Report received for Australian Serial No. 2023203066 on Aug. 31, 2023, 5 pgs.

Columbian Office Action received for Columbian Serial No. 13933 on Aug. 18, 2023, 3 pgs.

Displays: Products—Apr. 2017; HMT Mag; Retrieved from URL: https://www.hcinnovationgroup.com/home/article/13008154/displays-products-april-2017; [Retrieved on Oct. 19, 2023], Mar. 30, 2017.

* cited by examiner

202

DEVICE FOR DISPLAYING IMAGES FOR STANDS OR STAIRWAYS

This application is a National Stage Application of PCT/ES2019/070443, filed Jun. 25, 2019, which claims benefit of European Patent Application No. 18382473.9, filed Jun. 26, 2018, European Patent Application No. 18382701.3, filed Oct. 3, 2018, and Spanish Patent Application No. U201931056, filed Jun. 21, 2019, which applications are incorporated herein by reference. To the extent appropriate, a claim of priority is made to each of the above-disclosed applications.

BACKGROUND OF THE INVENTION

The present invention relates to a novel indicator device for displaying images which allows the use of stands or stairways in public venues, and more particularly in sports venues, for example football stadiums, multi-use sports halls or any other building, preferably in those cases where the stairways or stands are within the frame of a television camera which is broadcasting the event taking place there.

The present invention allows the display of the image or commercial logo to be optimised and allows the focusing of the television camera to be taken into account, achieving optimum display of the logo or image on said stands or stairways. The device according to the present invention is configured as an add-on which can be positioned on existing stands or stairways, without modifying said stands or stairways.

In the present invention, the terms 'image' and 'logo' should be taken as also meaning the graphic representation of a text, in combination or not with other graphic elements.

SUMMARY OF THE INVENTION

In the sports stadium advertising sector, various image deformation techniques, also known as anamorphic techniques, are widely known. Anamorphic techniques deform the image or logo that is to be shown, allowing an image to be seen from a viewpoint (referred to in this application as a 'vanishing point') with the desired characteristics. Said characteristics may be, for example, to observe the logo or image without deformation due to perspective, or to view said image or logo in a vertical configuration, despite the advertising device being placed horizontally, resting on the ground. Said devices are usually positioned on the ground on the sports pitch, outside the lines that delimit the field of play, or else inside the field of play and comprise a single laminar element which is placed on the ground (adhesive vinyl, painted layer, flat screen, etc.).

The object of the present invention is to disclose a technique which allows the use of stairways and stands with optimal visual results for the observer.

In particular, the present invention has a wide range of possible embodiments and may or may not be combined with anamorphic image deformation techniques, according to the needs of the particular application.

More particularly, the present invention discloses a device for displaying images, preferably advertising images, for stands or stairways in a public venue, which comprises a controller, a set of electronic screens arranged close to one another and means for securing said electronic screens to the risers of a stairway or stand, the controller having means for displaying an advertising motif distributed between all of said electronic screens.

The present invention uses the risers of the stand or stairway to arrange electronic screens thereon. The electronic screens are connected to one another so as to be able to act as a single screen, and the controller can therefore show a single advertising motif distributed between all the electronic screens. The controller may have means of anamorphically deforming the advertising motif.

The present invention has the advantage of leaving the treads of the stairway or stand free of screens. The device therefore cannot obstruct the area walked on by the public in the public venue.

The installation of this type of device on the stands and/or stairways of sporting stadiums has additional problems because the steps cannot be modified. Normally, said stands are made of concrete. It is therefore not possible to use the space beneath the stair tread. Consequently, placing an element on the riser reduces the available space on the tread and produces a change in the positioning of the apparent surface of the riser, which might render the positioning of the device unfeasible for architectural reasons.

It is also an object of the present invention to provide a solution to this problem, allowing the existing physical space to be used in the best possible way while meeting design, construction and safety rules and regulations.

Accordingly, the present invention discloses a device of the type mentioned above, in which the signal processing and data elements and the power supply elements of at least one of said electronic screens arranged on the risers are placed in a box separate from the screen, which box is intended to be installed separately from the screen, preferably away from the stairway on which the screen is placed. More preferably, the device will comprise respectively a separate box for each screen. In addition, preferably, each separate box will be situated beneath seats attached to the stand or stairway. In exceptional cases, for example, where the stand and/or stairway is movable and the rear portion thereof is accessible, at least one separate box or boxes may be situated hidden behind the stairway or stand.

The present invention allows the thickness (or depth) of the screens secured to the riser to be reduced, minimising the drawbacks described above. Finally, the present invention allows the dimensions of the electronic element where the image (whether graphic, photographic or video) is generated to be adjusted, so as to produce a coupling customised to the dimensions of the riser and in turn to achieve a background which keeps the construction proportions within the limits prescribed by the design regulations. This effect is achieved by being able to separate the signal (photographic, video or graphic) data processing element and the power supply elements of said system, by incorporating said elements in a 'separate box' containing said elements.

Said separate box may be designed so as to contain the processing elements (data and power supply), guarantee an IP and IK level of protection, which in turn guarantees direct protection of the elements and indirect protection of people. The protection ratings of the screen and of the separate box may vary, preferably between IP54 and IP68 and between IK03 and IK10. An additional advantage associated with the invention is to allow the mechanical and weather resistance requirements for the separate box to be relaxed compared with the requirements for the screen. Thus, for example, the separate box may preferably have protection ratings of IP 65 and IK 07 or above, whereas the screen may have protection ratings of IP 68 and IK 10 which are the maximum currently envisaged under the regulations. The screen may have extra protection against the weather compared to that of the shell or external surface thereof. In particular, it may have a resin or silicone barrier. Said resin or silicone barrier may preferably have a protection rating of IP 65 or above.

The electronic screens will preferably be serially connected to each other, more preferably by at least a data cable and a power cable. Both cables may be incorporated in a single multicable.

Preferably, the controller will be positioned separate from the screens, preferably away from the stairway or stand on which the screens are positioned.

According to another aspect of the present invention, specific morphologies of the device are disclosed which are resistant and do not cause inconvenience to the spectators at a sports venue.

Preferably, each screen comprises a transparent element connected to the stand or stairway and a light-emitting electronic element which is positioned between the stand or stairway and the transparent element, the unit being sealed. Preferably, the unit is designed with anti-vandal characteristics. Accordingly, the screens preferably do not have any cover that can be actuated to access the interior thereof.

In an optional production, any free spaces that remain between the transparent element and the stand or stairway are filled with resin or silicone.

Preferably, the screen will be screwed, bonded or anchored to the step by any securing method. According to an aspect of the present invention, the upper portion of the screen is arranged as an extension of the tread of the stair. Accordingly, preferably, the upper portion of the screen is installed flush with the adjacent tread, forming an extension thereof.

Preferably, the upper surface of the upper portion of the screen will be non-slip. Preferably, the slip resistance (Rd) of said surface will be greater than 4 T both dry and wet, in other words Category 3, according to Spanish regulation UNE-ENU 12600:2003 the slip resistance Rd will be measured by the pendulum test based on Spanish regulation UNE-ENU 16233:2003.

Also preferably, the transparent element comprises a UV-ray protection filter for the emitting element, which will extend the life of the internal elements, and/or a light-diffusing finish, which improves the perception by the user of the advertising motif emitted.

The emitting element or screen may preferably be an LCD screen of LEDs. Said screen may also be of another type, such as a graphene screen, for example.

According to the present invention, it is advantageous for the screen to be as thin as possible. Preferably, the screen has a thickness of less than 100 mm. More preferably, said screen has a thickness of less than 50 mm. It will be possible, by means of the present invention, to reduce the thickness to approximately 10 mm.

In an especially preferred manner, the transparent element is embossed with an advertising motif. This allows an additional fixed advertising element to be included which will not be distinguished by the camera or by distant spectators, but will be distinguished by spectators in the sports venue located in the vicinity of the screen.

The use of electronic devices in the arrangement of the present invention provides the advantage of being able to use the device for functions other than that of displaying advertising to be seen from a camera. For example, the controller preferably comprises instructions for displaying information on each screen on the status of nearby seats and/or entry/exit instructions to/from said seats. The device according to the present invention may be used to indicate evacuation routes in emergencies. That is to say, the device may indicate the exit routes in the event of an evacuation. At present, the applicant does not know of the existence of devices that are able to do this. The device according to the present invention may even form an integral part of evacuation information in sports stadiums. In such places, the lack of a roof and walls makes the placing of boards indicating evacuation flows extremely difficult. The device may be provided with a communication post (for example, an RJ45-type connector) which would interrupt the emission of advertising content and change to evacuation information mode if there is an emergency.

Preferably, the system may have a UPS (uninterruptible power source), which allows said system to continue functioning in the event of a power cut.

The device may have stored instructions and/or images for emitting evacuation signals. Each separate box may comprise a memory storing the corresponding images. Said memory may be an operating memory of the elements that already exist in the separate box. This means that the device can emit evacuation signals if communications with the device are cut. If there is an uninterruptible power source, this allows the signals to be emitted even if the power supply is lost in the sports stadium where the device is situated.

According to an aspect, the present invention is based on the use of vertical flights of steps (clearly visible to a distant observer) to achieve an acceptable effect.

The separate box may comprise a card controlled by wireless communication or by cable. Preferably, said cards may allow all the available image parameters to be controlled individually, if required.

In a preferred embodiment, the device comprises a separate box for each screen. This embodiment provides redundant control, so that if a separate box fails, another separate box assumes control of the screen corresponding to the separate box that has failed.

Preferably, and for safety reasons, the separate boxes or control boxes will have redundant systems for video control and/or for energy control, to avoid failure. Thus, preferably, each separate box may comprise two power sources and/or two image reception cards. Also preferably, the connection between the separate boxes and the screens is end-to-end. Still more preferably, the separate boxes will be connected to one another. Even more preferably, each separate box will be connected directly to a single screen. Electric power transformers, which lower the supply voltage to the working voltage of the electronic elements of the screen and/or elements of the separate box, may also be considered to be power sources. In a particularly preferred embodiment, each separate box comprises two power sources and an image reception card, each card having the ability to control a set of some or all of the screens of the device, and configured to be able to do so if one of the cards fails.

The present invention is particularly applicable to sports venues and stadiums although it is not necessarily limited to said application.

For the preferred use of the present invention, the light-emitting power of the screen may be between 200 and 7000 cd/m². More preferably, it will be between 3000 and 7000 cd/m². Still more preferably, it will be between 4000 and 6000 cd/m². In any event, the device will have means for dynamically adjusting its intensity to the ambient conditions, in order to give an optimal result, especially for sports transmissions.

The present invention also discloses stand or stairway units which have a device according to the present invention installed on the steps thereof.

For a better understanding, the accompanying drawings show an embodiment of the present invention as an explanatory but non-limiting example.

BRIEF DESCRIPTION OF THE DRAWINGS

FIGS. 1 to 3 show a device —1100— according to the present invention positioned on a stand or stairway. The device comprises a series of electronic screens —1110— connected serially by multicables —1120— which comprise a power cable and a data cable. Other arrangements (arrangement in parallel, battery-powered screens, wireless data communication) are also possible.

Serial cabling saves cables and space.

The electronic screens are placed on the risers —2010— of the stairway, leaving the treads —2020— free. In the example shown, the electronic screens —1100— are positioned beneath an existing projecting ledge —2030— on the tread —2020— of each step.

Each electronic screen —1110— is made up of a transparent element —1140—, for example a methacrylate board, which is secured at a specific distance from the riser —2010—, for example using threaded studs —1150— drilled into the stairway. The space between the transparent element —1140— and the riser —2010— is occupied by an emitting element —1130—, for example an LED screen. The space that is left free may be occupied by a filler element, for example resin or silicone.

The electronic screen unit —1110— is sealed to protect the electronic elements from water.

Figure 1:
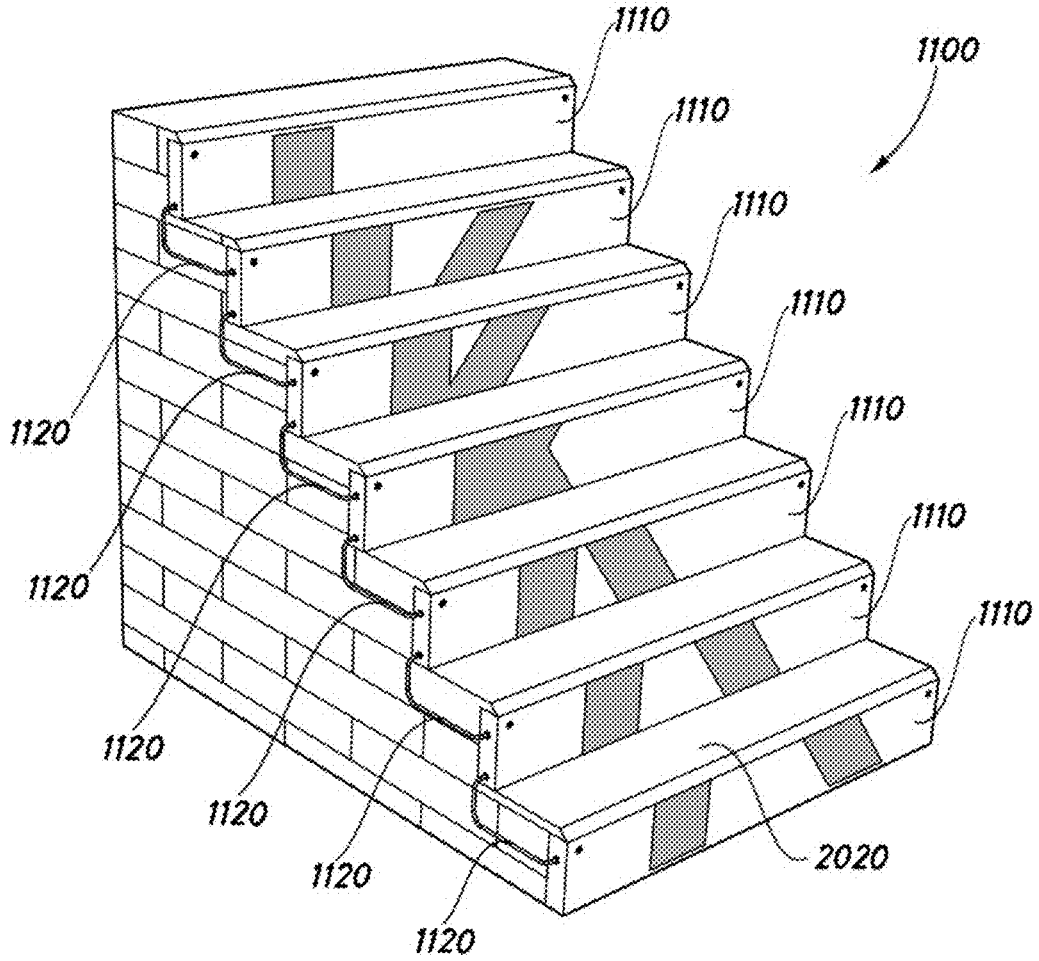
FIG. 1 is a diagrammatic perspective view of a first embodiment of the present invention.
Figure 2:
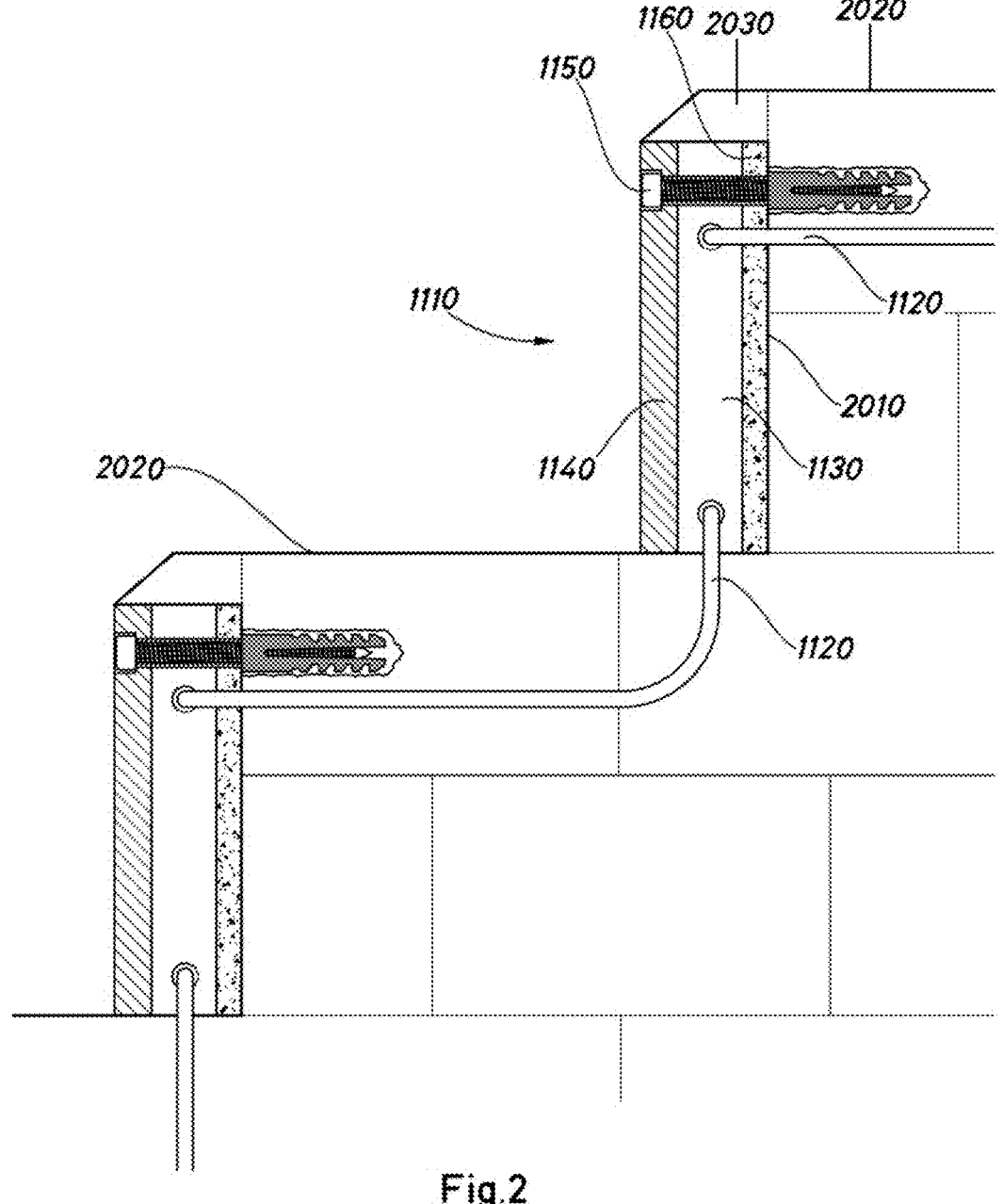
FIG. 2 is a side view partly in cross section of a detail showing elements which make up the screen in the example of the first embodiment.
Figure 3:
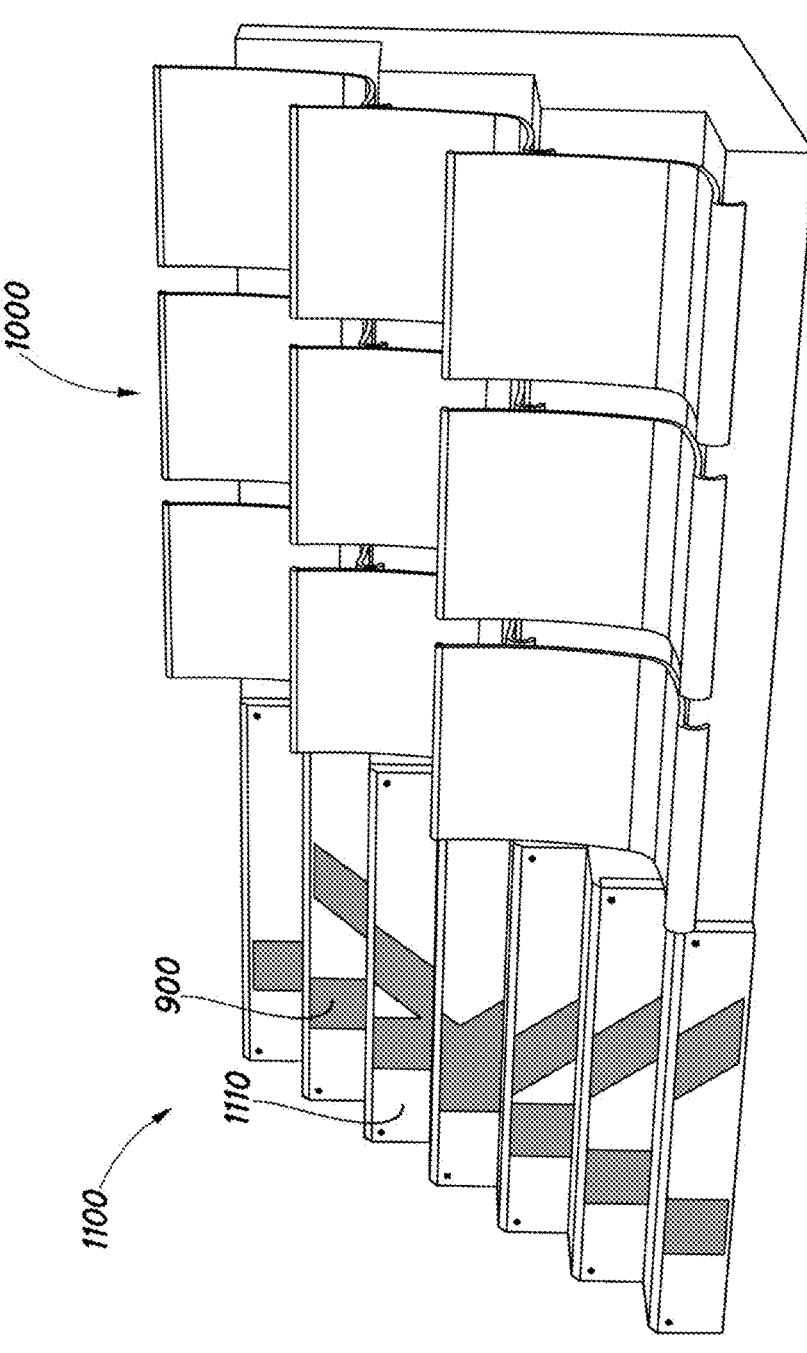
FIG. 3 is a perspective view of an example of deformation of the logo or image that is to be represented starting with any of the divisions of FIG. 1 or FIG. 2.
Figure 4:
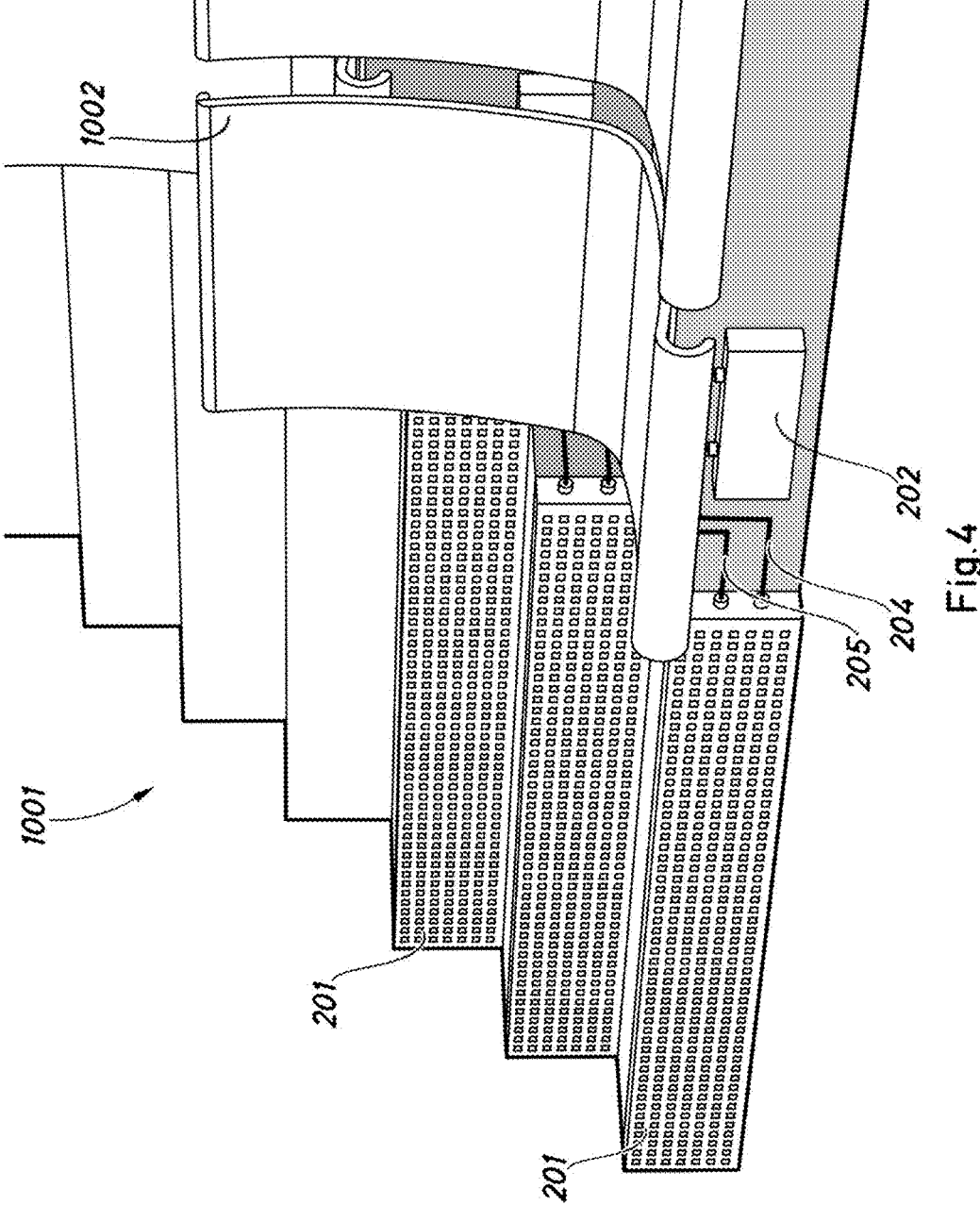
FIG. 4 is a perspective view of a second embodiment of a device according to the present invention, installed on the stand of a sports stadium.
Figure 5:
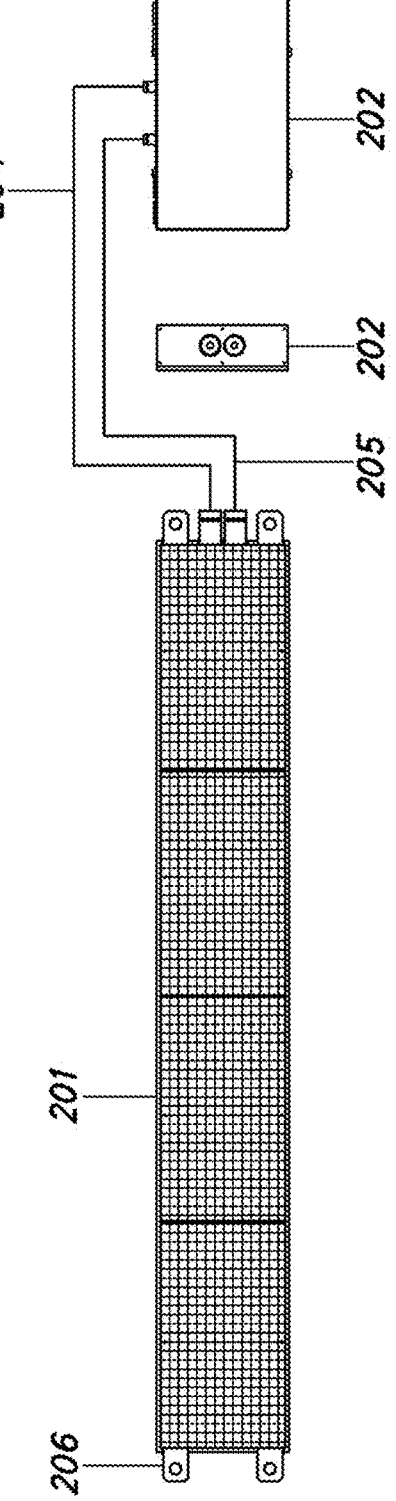
FIG. 5 is a diagrammatic plan view of a portion of a device according to the present invention similar to that of the previous figure, in which the two separate elements making up said device can be seen.
Figure 6:
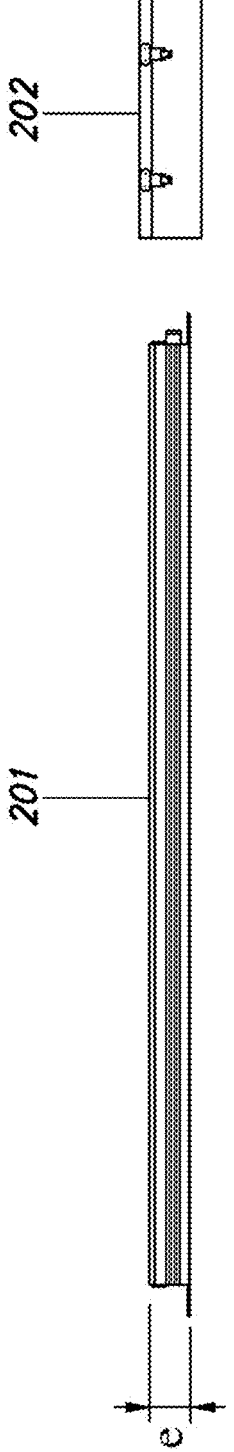
FIG. 6 is a diagrammatic plan view from above of the two separate elements.
Figure 6:
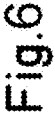
Figure 7:
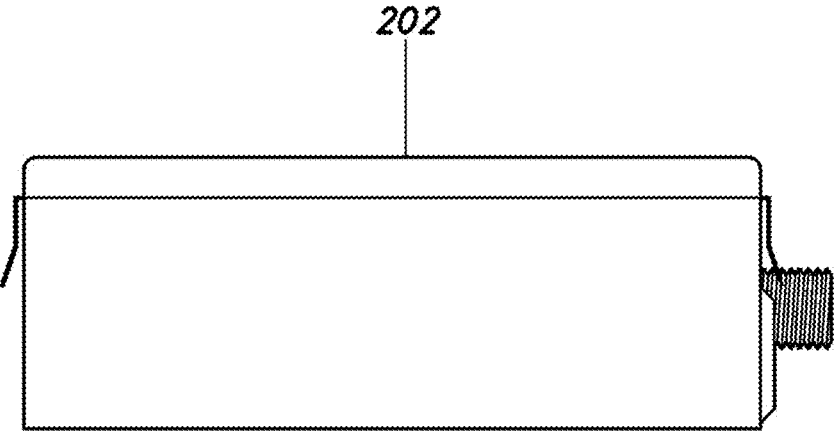
FIG. 7 is a view in side elevation of an example of a separate box.

In the embodiment shown in FIGS. 1 to 3, each emitting element —1130— has its own electronics, independent of the rest of the emitting elements.

The transparent element —1140— may have UV protection and/or a light-diffusing finish. This is advantageous not only because it protects the life of the emitting element —1130—, but because it diffuses the specific light-emitting points (LEDs) improving perception of the logo emitted.

Although not shown in the figures, the transparent element may be embossed with an advertising motif. This motif can only be detected by audience members who are close to the screen, and not by those farther away, who can only see the advertising motif emitted by the electronic screens —1110—.

In the figures, the controller, for example a control computer which may for example be positioned remotely from the rest of the device, connected by cables or wirelessly, has not been shown. The controller can synchronise the various devices —1100— with one another, synchronise the motif emitted with the television broadcast, be updated via the internet, etc.

In FIG. 3 the device —1100— of FIGS. 1 and 2 has been shown applied to the stairways of a stand —1000— in a sports venue. The set of screens —1110— are emitting an advertising motif —900— (in this case a letter K), which may if required be anamorphically deformed to be seen from a particular viewpoint, such as a master transmission camera, for example, or other type of camera. It can be seen in the figure that the screens —1110— may also be used to show information relating to the stands and to the entry and exit flows, such as a row number, as well as safety information, for example arrows indicating the route to follow if the venue has to be evacuated.

FIGS. 4 to 9 show another embodiment of a device according to the present invention positioned on a stand or stairway —1001—. The device comprises a series of electronic screens —201— (in this case, an LED screen) which in this case are not connected to one another directly. Each screen has lugs 206 with openings for receiving studs for securing to a stairway.

The electronic screens are placed on the risers of the stairway, leaving the treads free (although it is possible to occupy said treads). In the case shown, the electronic screens —201— are positioned so that said screens are flush with the stair tread. A non-slip strip may be placed on said upper portion flush with the stair tread.

In another embodiment (not shown) the electronic screen may be positioned beneath a projecting ledge on the tread of each step.

None of the electronic screens in the example shown has signal processing and data elements and power supply network elements, which are located in separate boxes —202—, independent of the screens and which, in this case, are positioned beneath the adjacent seats —1002—. The screens in the example comprise boxes which comprise LEDs.

Figure 8:
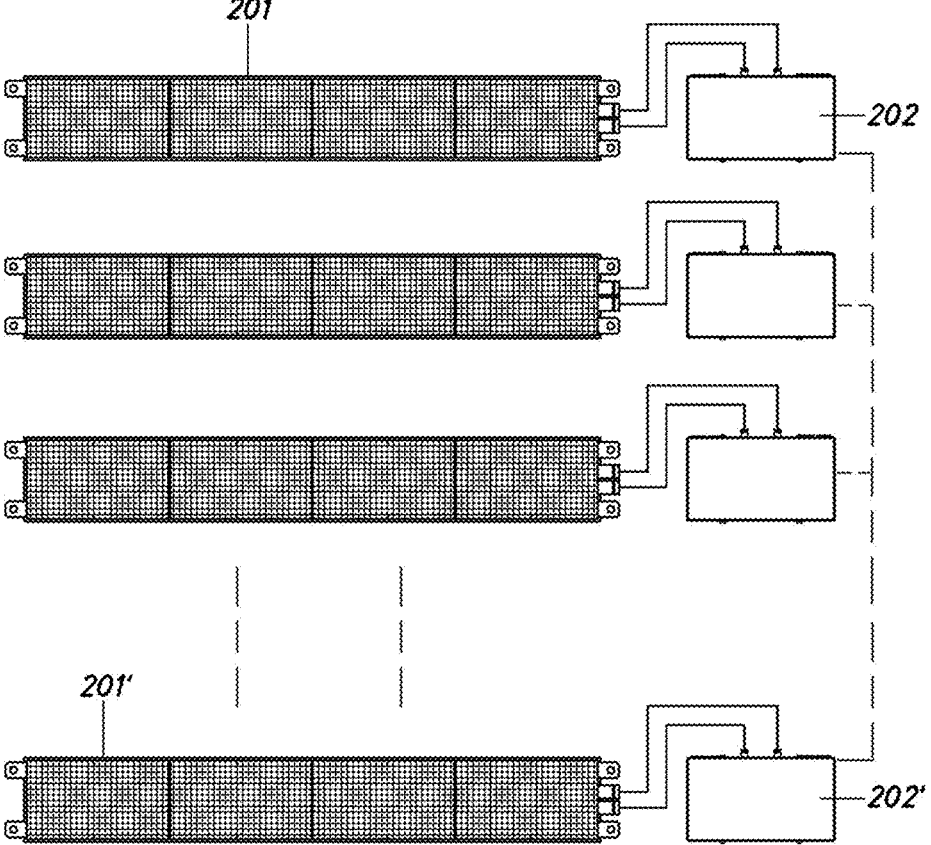
FIG. 8 shows diagrammatically a set of portions relating to another example of a device according to the present invention.

In the example shown, the screens and the separate boxes (also known as control boxes) are connected by a pair of cables —204—, —205—. In general, both the power supply and the signals corresponding to the commands to the light-emitting elements of the screens (for example, each individual LED) must be transmitted from the separate boxes to the screens. This may take place by means of separate cables, or by a single cable. In FIG. 8, a possible connection between separate boxes has also been shown diagrammatically without specifying the number of cables. The set of separate boxes may be connected in turn to a single central controller (not shown). The connections, in particular the control connections, may also be wireless.

The present invention discloses a solution in which the light-emitting elements (screen) are separated from the image processing and power elements (separate box) which allows better adaptation to the physical space that already exists in the stairway, making it easier to comply with design, construction and safety rules and regulations. It also facilitates adaptation to the physical space that already exists in the stand, stairway and possibly the seats. This is achieved with the minimum possible modification of the dimensions (width, height, depth) of the space in which the solution is to be implemented.

The existence of the separate box helps guarantee electronic stability in the image quality, even when the processing elements are remote from the signal (video, photographic or graphic) reproduction elements. Accordingly, the power signal and data are sent preferably through a single type of cable incorporating both signals.

The elements controlled from the separate box may comprise the following, for example:

Brightness
Contrast
Image refresh rate
Grey scale
Clock rate

The electronic screen unit is sealed to protect the electronic elements from water and should preferably mechanically support the use thereof as a stairway. The physical requirements and sealing requirements of the separate box may be lower.

As the video processing and power supply unit and the unit where the image is reproduced work separately, it is possible to develop and apply IP and IK protection ratings for both elements which guarantees direct protection of the elements in question and indirect protection of persons or of the public against possible direct or indirect contact with the systems.

Thus, for example, the electronic box or separate box may have an IP65 protection rating (dust-tightness and protection against jets of water) and an IK07 protection rating (supporting the impact of a 0.5 kg object from 200 mm), whereas the display system or screen may have an IP68 protection rating (dust-tightness and proof against prolonged immersion) and an IK10 protection rating (capable of supporting the impact of a 5 kg object from 200 mm).

Figure 9:
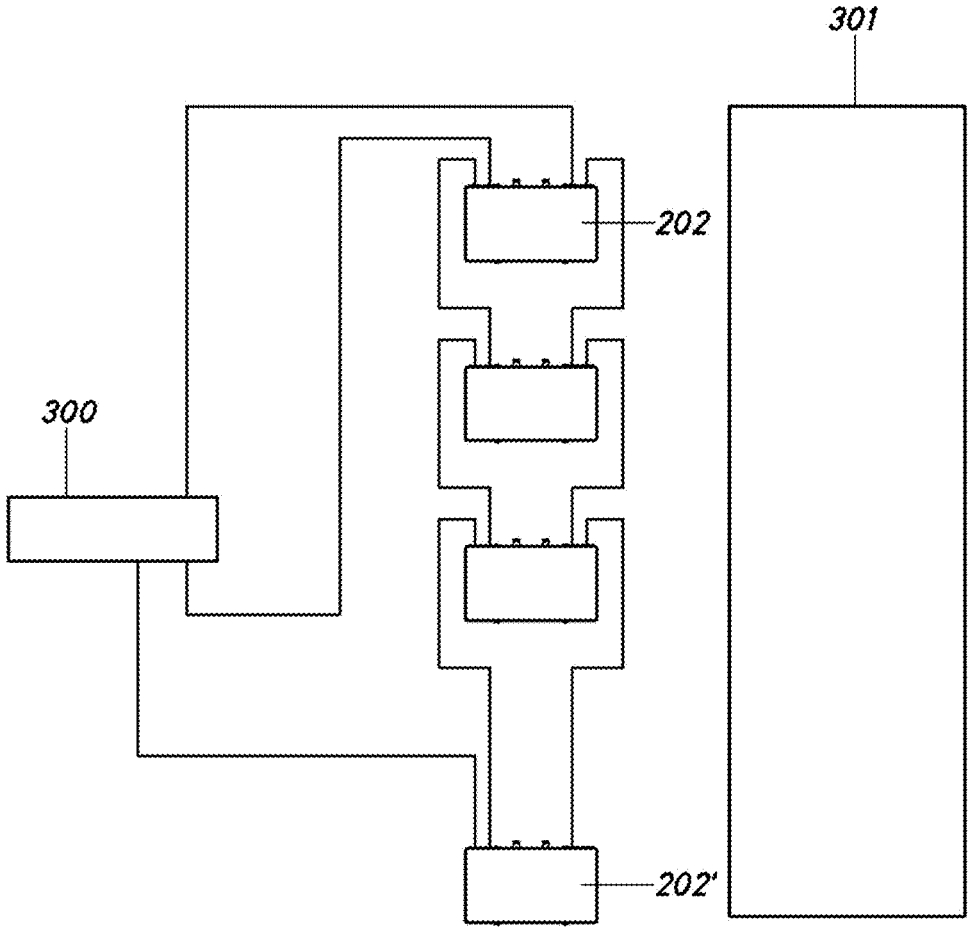
FIG. 9 shows diagrammatically an example of connections of a device according to the present invention.

FIG. 9 shows a connection diagram between the central control element —300— (not shown in FIGS. 1 to 5) and the separate boxes —202—, —202'— or power boxes. In this case, the power supply and control signal use different cables. It can also be seen that the different separate boxes are serially connected. Parallel connection would also be possible. The connection of the separate boxes to the screens has not been shown in FIG. 9. Each of the screens shows a portion of the image —301— that is to be displayed. The division of the image may be carried out using known techniques. The conversion of the image portion that is to be displayed into specific commands to the light-emitting elements of each screen may be carried out in each corresponding separate box.

The invention allows images and animations to be reproduced, distributed over all the screens. Preferably, the control may cancel the reproduction of screen portions where the display corresponds to the visual space occupied by the treads of the stairway from a particular position.

Each separate box, or control box, may have inside two power sources (PSU) and two image reception cards arranged redundantly in order to hot swap if necessary. In addition, the connection between the electronics and the step may be end-to-end. The aim is that if a step ceases to function, the rest of the components continue to do so.

The control boxes (separate boxes) are connected to one another and each one connected directly to the screen corresponding to a step.

As already explained, not all the screens that show elements forming the image to be represented need necessarily be arranged on risers. Said elements may also be positioned on treads, or on barriers for example situated in the middle of an ascending stairway, interfering with the surface required for the image. By placing a screen on said barrier or surface, said barrier is incorporated with the image —301— that is to be represented.

Despite all the steps having been shown in the example with the same height, the invention may be applied to steps of different heights. Accordingly, preferably the dimensions and number of pixels emitted from each screen may vary. In a particular case, it is even possible to use screens that are higher than the corresponding step. In this case, it is possible for example to bury a portion of the screen in the adjacent tread and using the control to eliminate the pixels that are buried or hidden, so that said pixels do not emit light. However, it is preferable for the height of each screen element to be equal to or less than that of the corresponding riser.

The invention is compatible with virtual advertising techniques, which allow the post-production insertion of advertising. Accordingly, the screens may incorporate the necessary technology to facilitate virtualisation using current advertising systems (such as incorporating infrared LEDs, for example) to mark the area where the virtual advertising should be incorporated when broadcast goes out.

The different characteristics of the embodiments shown may be combined with one another.

Although the invention has been presented and described with reference to embodiments thereof, it will be understood that said embodiments do not limit the invention and many structural or other details which may become clear to persons skilled in the art after interpreting the subject matter which is disclosed in the present description, claims and drawings, may vary. Thus, all variants and equivalents will be included within the scope of the present invention if said variants and equivalents can be considered to fall within the widest compass of the following claims.

The invention claimed is:

1. A device for displaying images for stands or stairways in a public venue comprising:

a central controller;

a plurality of electronic screen assemblies serially connected to one another, wherein each screen assembly has a thickness of less than 50 mm and is sealed having an IP protection rating between IP54 and IP68 and an IK protection rating between IK03 and IK10 and comprises a transparent element connected to a vertical face of the stand or stairway and a light-emitting electronic element which is positioned between the stand or stairway and the transparent element, wherein the transparent element comprises one or more of UV protection or a light-diffusing finish; and means for securing one of said electronic screen assemblies to a corresponding riser of a stairway or stand, each of the screen assemblies are secured to the risers of the stand or stairway; the central controller having means for displaying an advertising motif distributed between all of said electronic screen assemblies, and the central controller comprising instructions for displaying information on each screen on status of nearby seats and/or entry/exit instructions to/from said seats or other safety information, and instructions for displaying information on each screen on status of nearby seats and/or entry/exit instructions to/from said seats or other safety information;

a plurality of separate control boxes connected to the central controller and serially connected to one another, wherein each of the plurality of control boxes is connected directly to one of the plurality of screen assemblies corresponding to a step, wherein each of the control boxes is separate and mounted apart from the screen assemblies and configured to be installed and positioned beneath seats attached to the stand or stairway, or hidden behind the stairway, wherein an upper portion of the screen is flush with an adjacent tread and an upper surface of the upper portion of the screen has a non-slip finish, forming an extension of the adjacent tread so the device leaves treads of the stand or stairway free;

wherein the plurality of screen assemblies are connected serially by multicables comprising a power cable and a data cable, wherein signal processing elements, data elements, and power supply elements are associated with each emitting element and are housed in a respective control box, and said signal processing and data elements comprising two power sources (PSU) or voltage transformers arranged redundantly, and two image reception cards arranged redundantly in the control box, wherein the two power sources and the two image reception cards are removably and interchangeably housed in the control box;

wherein the separate boxes control one or more of the following:
brightness,
contrast,
image refresh rate,
grey scale,
clock rate;

wherein mechanical and weather resistance requirements for the plurality of control boxes are reduced compared with mechanical and weather resistance requirements for the screen assemblies.

2. The device according to claim 1, wherein the transparent element is screwed to the stairway or stand.

3. The device according to claim 1, comprising a communication post configured to interrupt emission of advertising content, and to change to evacuation information mode in an emergency.

4. The device according to claim 3, wherein each of the plurality of control boxes comprises a memory storing evacuation signals.

5. A device for displaying images for stands or stairways in a public venue comprising:

a central controller;

a plurality of electronic screen assemblies serially connected to one another, wherein each screen assembly has a thickness of less than 50 mm and is sealed having an IP protection rating between IP54 and IP68 and an IK protection rating between IK03 and IK10 and comprises a transparent element connected to a vertical face of the stand or stairway and a light-emitting electronic element which is positioned between the stand or stairway and the transparent element, wherein the transparent element comprises one or more of UV protection or a light-diffusing finish; and means for securing one of said electronic screen assemblies to a corresponding riser of a stairway or stand, each of the screen assemblies are secured to the risers of the stand or stairway; the central controller having means for displaying an advertising motif distributed between all of said electronic screen assemblies, and the central controller comprising instructions for displaying information on each screen on status of nearby seats and/or entry/exit instructions to/from said seats or other safety information, and instructions for displaying information on each screen on status of nearby seats and/or entry/exit instructions to/from said seats or other safety information;

a plurality of separate control boxes connected to the central controller and serially connected to one another, wherein each of the plurality of control boxes is connected directly to one of the plurality of screen assemblies corresponding to a step, wherein each of the control boxes is separate and mounted apart from the screen assemblies and configured to be installed and positioned beneath seats attached to the stand or stairway, or hidden behind the stairway, wherein the stand or stairway includes a step comprising a projecting ledge on a tread of each step, wherein one of the electronic screen assemblies is positioned beneath the projecting ledge so the device leaves treads of the stand or stairway free;

wherein the plurality of screen assemblies are connected serially by multicables comprising a power cable and a data cable, wherein signal processing elements, data elements, and power supply elements are associated with each emitting element and are housed in a respective control box, and said signal processing and data elements comprising two power sources (PSU) or voltage transformers arranged redundantly, and two image reception cards arranged redundantly in the control box, wherein the two power sources and the two image reception cards are removably and interchangeably housed in the control box;

wherein the separate boxes control one or more of the following:
brightness,
contrast,
image refresh rate,
grey scale,
clock rate;

wherein mechanical and weather resistance requirements for the plurality of control boxes are reduced compared with mechanical and weather resistance requirements for the screen assemblies.

* * * * *